US012343651B1

(12) United States Patent
Burneson

(10) Patent No.: US 12,343,651 B1
(45) Date of Patent: Jul. 1, 2025

(54) MULTI-TEXTURED SENSORY DEVELOPMENT PLUSH TOY WITH INTEGRATED TEETHING AND PACIFIER FEATURES

(71) Applicant: Dane Burneson, Greenwood Village, CO (US)

(72) Inventor: Dane Burneson, Greenwood Village, CO (US)

( * ) Notice: Subject to any disclaimer, the term of this patent is extended or adjusted under 35 U.S.C. 154(b) by 0 days.

(21) Appl. No.: 19/050,442

(22) Filed: Feb. 11, 2025

Related U.S. Application Data

(60) Provisional application No. 63/634,427, filed on Apr. 15, 2024.

(51) Int. Cl.

| | |
|---|---|
| ***A63H 3/00*** | (2006.01) |
| ***A61J 17/00*** | (2006.01) |
| ***A61J 17/02*** | (2006.01) |
| ***A63H 3/02*** | (2006.01) |

(52) U.S. Cl.
CPC ............ *A63H 3/003* (2013.01); *A61J 17/001* (2015.05); *A61J 17/02* (2013.01); *A61J 17/1111* (2020.05); *A63H 3/02* (2013.01)

(58) Field of Classification Search
CPC A63H 3/02; A63H 3/003; A63F 17/00; A63F 17/001; A63F 17/02; A63F 17/1111; A63F 17/107
USPC .................................. 446/72, 227, 369, 486
See application file for complete search history.

(56) References Cited

U.S. PATENT DOCUMENTS

| | | | | |
|---|---|---|---|---|
| 3,669,117 A * | 6/1972 | Herbst | A61J 17/001 | 606/235 |
| 4,968,279 A * | 11/1990 | Smith | A63H 33/006 | 5/636 |
| 5,201,073 A * | 4/1993 | Spanier | A41B 13/103 | 446/28 |
| 5,344,355 A | 9/1994 | Silverstein | | |
| 5,993,285 A * | 11/1999 | Sofia | A63H 3/14 | 446/26 |
| 6,427,265 B1 * | 8/2002 | Dix | A47D 15/00 | 5/655 |
| 6,666,740 B1 | 12/2003 | Schneider | | |

(Continued)

*Primary Examiner* — Joseph B Baldori
(74) *Attorney, Agent, or Firm* — Colorado Venture Patents LLC

(57) ABSTRACT

A multi-textured sensory development plush toy integrates teething functionality and optional pacifier features to provide comprehensive infant stimulation. The invention combines a plush toy body with specially engineered appendages featuring distinct textures including bumps, rings, smooth surfaces, and fuzzy materials. Each appendage incorporates medical-grade Liquid Silicone Rubber meeting stringent biocompatibility standards, with precisely controlled dimensions and textures designed to promote tactile exploration and motor skill development. The textured elements include uniformly distributed raised patterns, concentric ridges, and fabric-covered surfaces, all engineered to provide specific sensory feedback. The invention addresses the need for multi-functional infant toys that engage multiple senses simultaneously while incorporating practical features like teething relief and pacifier attachment. This comprehensive design eliminates the need for multiple separate devices while providing a safe, hygienic, and developmentally stimulating experience that grows with the child's sensory needs.

6 Claims, 9 Drawing Sheets

(56) References Cited

U.S. PATENT DOCUMENTS

| | | | | |
|---|---|---|---|---|
| 6,827,317 | B1 * | 12/2004 | Maki Risaliti | A61J 17/02 248/105 |
| 9,744,104 | B1 * | 8/2017 | Weston | A61J 17/02 |
| 10,258,544 | B2 | 4/2019 | Kim | |
| 11,141,668 | B2 * | 10/2021 | Lakritz | A63H 3/02 |
| 11,638,679 | B2 | 5/2023 | Schneider | |
| 11,744,780 | B2 * | 9/2023 | Gharibian | A61J 17/107 606/235 |
| 11,833,111 | B1 * | 12/2023 | Sammons | A61J 17/02 |
| 11,918,543 | B2 * | 3/2024 | Benezri | A63H 3/02 |
| 2002/0187719 | A1 | 12/2002 | Schneider | |
| 2005/0245968 | A1 * | 11/2005 | Huberman | A61J 17/1111 606/235 |
| 2007/0054593 | A1 * | 3/2007 | Santos | G09B 1/02 446/369 |
| 2009/0081921 | A1 | 3/2009 | Urueta | |
| 2009/0270010 | A1 | 10/2009 | Scott et al. | |
| 2009/0287247 | A1 * | 11/2009 | Chipperson | A61J 11/00 606/235 |
| 2010/0304636 | A1 | 12/2010 | Seiz | |
| 2011/0250821 | A1 * | 10/2011 | Beardsley | A63H 3/02 446/369 |
| 2012/0083842 | A1 * | 4/2012 | Barton | A61J 17/02 606/235 |
| 2012/0290007 | A1 * | 11/2012 | Rohrig | A61J 17/02 606/235 |
| 2013/0089276 | A1 * | 4/2013 | Noble | A61J 17/113 383/42 |
| 2014/0243895 | A1 * | 8/2014 | Kellogg | A61J 17/02 606/235 |
| 2016/0158112 | A1 * | 6/2016 | Summers | A63H 3/02 446/73 |
| 2016/0199264 | A1 * | 7/2016 | McClintock | A63H 3/003 446/73 |
| 2016/0236103 | A1 * | 8/2016 | Pettrey, III | A63H 3/02 |
| 2017/0151504 | A1 | 6/2017 | Villano et al. | |
| 2018/0078866 | A1 * | 3/2018 | Rogone | A61J 17/1111 |
| 2018/0214350 | A1 * | 8/2018 | Schneider | A61J 17/1111 |
| 2019/0059566 | A1 * | 2/2019 | Gaudyn | A45F 5/02 |
| 2019/0175454 | A1 * | 6/2019 | Pierce | A61J 17/1111 |
| 2022/0054796 | A1 * | 2/2022 | McGreevy | A61M 21/02 |
| 2022/0125685 | A1 * | 4/2022 | Farzin | A61J 17/02 |
| 2023/0024883 | A1 | 1/2023 | Schneider et al. | |
| 2023/0080026 | A1 * | 3/2023 | Gharibian | A61J 17/107 606/235 |
| 2023/0233415 | A1 * | 7/2023 | Wagner | A61J 17/02 606/235 |
| 2023/0233418 | A1 * | 7/2023 | Evers | A61J 17/101 606/235 |

* cited by examiner

MULTI-TEXTURED SENSORY DEVELOPMENT PLUSH TOY WITH INTEGRATED TEETHING AND PACIFIER FEATURES

CROSS-REFERENCE TO RELATED APPLICATION

This application claims the benefit of U.S. Provisional Patent Application 63/634,427, filed on Apr. 15, 2024, which is hereby incorporated by reference in its entirety.

BACKGROUND OF THE INVENTION

Field of the Invention

The present invention pertains to the field of infant care products, specifically to an integrated plush toy that combines the features of a comforting soft toy, a pacifier attachment, and a teething device. The invention falls within the category of developmental baby toys designed to address the multifunctional needs of infants and caregivers. It encompasses the areas of product design, material science, and child development, focusing on providing a safe, hygienic, and sensory-stimulating experience for infants. The invention is particularly concerned with the use of hypoallergenic materials suitable for direct contact with an infant's skin, the prevention of loss or misplacement of pacifiers and teethers, and the enhancement of an infant's tactile and sensory development through various textures integrated into the toy's appendages.

Relevant Prior Art

The contemplated invention aims to solve several problems faced by parents and caregivers of infants and young children. Currently designed infant care products, particularly those related to pacifiers and teething toys, often overlook the critical aspect of sensory engagement and stimulation, which are essential for the healthy development of infants. Existing pacifier attachments and teething toys tend to focus on a singular function, either providing comfort or addressing the teething discomfort, but they do not fully engage the child's senses or provide the comprehensive stimulation necessary for their developmental needs. Infants, during their early stages of growth, require experiences that can engage multiple senses simultaneously, as this multisensory stimulation is crucial for cognitive and motor skill development. As a result, there remains a need for infant toys that offer sensory-rich experiences, which not only soothe but also promote developmental milestones. Such toys should include varied textures that are safe for mouthing and chewing, as these actions are not only comforting for infants but also play a significant role in sensory exploration and learning. The act of exploring different textures with their mouths helps infants develop tactile awareness and can aid in the progression of fine motor skills, such as grasping and coordination. Relatedly, there remains a need to provide such diversified sensory-rich experiences in the context of a unified toy, to eliminate the need for caregivers to carry and keep track of multiple devices.

Another challenge is the frequent loss or misplacement of pacifiers, which can cause distress for both the child and the caregiver. Additionally, the need for a separate teething device often means that caregivers must carry and keep track of multiple items, increasing the likelihood of losing these essential baby accessories.

Another problem is the lack of multi-functional infant toys that can serve as both a comforting plush toy and a practical teething aid. Infants often require both a soothing object, like a pacifier or a soft toy, and a teething device to help alleviate the discomfort of emerging teeth. Combining these functions into one product simplifies caregiving and ensures that the child always has access to teething relief.

In association with infant care products, particularly those that involve direct contact with an infant's delicate skin, there exists a critical need to address potential allergenic and irritation concerns. Traditional materials used in the construction of pacifier loops and teething toys have often included substances such as latex, which carries the risk of inducing allergic reactions, or phthalates, which have been associated with various health issues. Furthermore, the presence of Bisphenol A (BPA) in some plastics has raised concerns due to its estrogen-mimicking properties. These materials, while commonly used, pose a risk to infants who are particularly vulnerable to allergens and irritants due to their developing immune systems and sensitive skin. Additionally, the potential for bacterial growth on porous materials presents a hygiene challenge, necessitating frequent and thorough cleaning to ensure the safety and well-being of the child. Therefore, there is a pressing need for a material solution that not only mitigates the risk of allergic reactions and skin irritations but also offers ease of maintenance while ensuring the product's longevity and durability.

Currently designed infant care products, particularly those related to pacifiers and teething toys, often overlook the critical aspect of sensory engagement and stimulation, which are essential for the healthy development of infants. Existing pacifier attachments and teething toys tend to focus on a singular function, either providing comfort or addressing the teething discomfort, but they do not fully engage the child's senses or provide the comprehensive stimulation necessary for their developmental needs. Infants, during their early stages of growth, require experiences that can engage multiple senses simultaneously, as this multisensory stimulation is crucial for cognitive and motor skill development. As a result, there remains a need for infant toys that offer sensory-rich experiences, which not only soothe but also promote developmental milestones. Such toys should include varied textures that are safe for mouthing and chewing, as these actions are not only comforting for infants but also play a significant role in sensory exploration and learning. The act of exploring different textures with their mouths helps infants develop tactile awareness and can aid in the progression of fine motor skills, such as grasping and coordination. Relatedly, there remains a need to provide such diversified sensory-rich experiences in the context of a unified toy, to eliminate the need for caregivers to carry and keep track of multiple devices.

The prior art, including the disclosures made in U.S. Pat. No. 6,666,740 dated Dec. 23, 2003 and 11,638,679 United States Patent dated May 2, 2023, which are hereby incorporated by reference in their entirety, presents several limitations. The immediately aforementioned patents describe a stuffed toy with an attached pacifier, which, while innovative, does not address the need for a teething function integrated into the toy. The toy described in U.S. Pat. No. 6,666,740, for example, reflects challenges in the to clean its various aspects easily, which is a significant concern given the importance of hygiene for infant products.

U.S. Pat. No. 11,638,679 introduces a releasable coupling mechanism for the pacifier, which offers some improvement in terms of cleanliness and pacifier replacement. However, it does not provide a solution for the teething needs of the child, nor does it incorporate sensory-stimulating features into the design.

SUMMARY OF THE INVENTION

The preferred embodiment of the invention presents a novel approach to infant care by integrating a plush toy with a pacifier attachment feature and teething functionality. This innovative design addresses several shortcomings in the current market for infant toys and accessories, particularly those identified in the prior art. By merging the comforting aspects of a plush toy with the practicality of a pacifier and the soothing benefits of a teether, the preferred embodiment offers a comprehensive solution for both infants and caregivers.

One of the primary advantages of the contemplated invention is its dual functionality. Caregivers often juggle multiple items to cater to an infant's needs, such as a separate pacifier for soothing and a teether for gum relief during the teething phase. The preferred embodiment of the invention eliminates the need to carry and keep track of two separate items by combining them into one accessible and easy-to-manage product. The plush toy serves as a familiar and comforting object for the child, while in the preferred embodiment the attached pacifier is readily available for use when needed. Various embodiments of the invention feature appendages of the plush toy featuring a variety of textures. In an exemplary embodiment, the appendages are dipped in textured rubber, optionally silicone, which is safe for infants to chew on and provides relief for sore gums as teeth begin to emerge. In embodiments, at least some of the appendages feature a soft fabric, or fuzzy, texture.

In an embodiment, the textured rubber tips of the toy's appendages are designed to stimulate a child's tactile senses. Sensory exploration is a critical aspect of an infant's development, and providing various textures can enhance this exploratory experience. The material that the appendages comprise, optionally a rubber, is chosen for its durability, ease of cleaning, and safety for oral use. The texture or textures of the toy's appendages is carefully crafted to be gentle on an infant's delicate gums while offering the necessary resistance to aid in teething relief.

Furthermore, the preferred embodiment tackles the common issue of misplaced or lost pacifiers and teethers. By securely attaching the pacifier to the plush toy, the preferred embodiment ensures that the pacifier remains within the child's reach and is less likely to be dropped or lost. This feature is particularly beneficial when the child is in a stroller, car seat, or crib, where retrieving a dropped pacifier or teether can be challenging for the caregiver. In an alternative example, the pacifier attachment is configured for easy removal and replacement of the pacifier from the remaining aspects of the plush toy for cleaning or replacement, adding to the convenience and hygiene of the product. Alternative embodiments do not comprise a pacifier.

In summary, the contemplated invention offers a multifaceted solution to the needs of infants and caregivers. It simplifies the caregiving process by combining a plush toy, teether and optionally a pacifier into one comprehensive product. The textured rubber-dipped and fuzzy appendages provide sensory stimulation and teething relief, while in an exemplary embodiment the secure attachment of the pacifier addresses the practical concerns of managing and locating infant accessories. This inventive approach to infant care products represents a significant advancement over the prior art, offering a more engaging, convenient, and soothing experience for infants.

Figure 1:
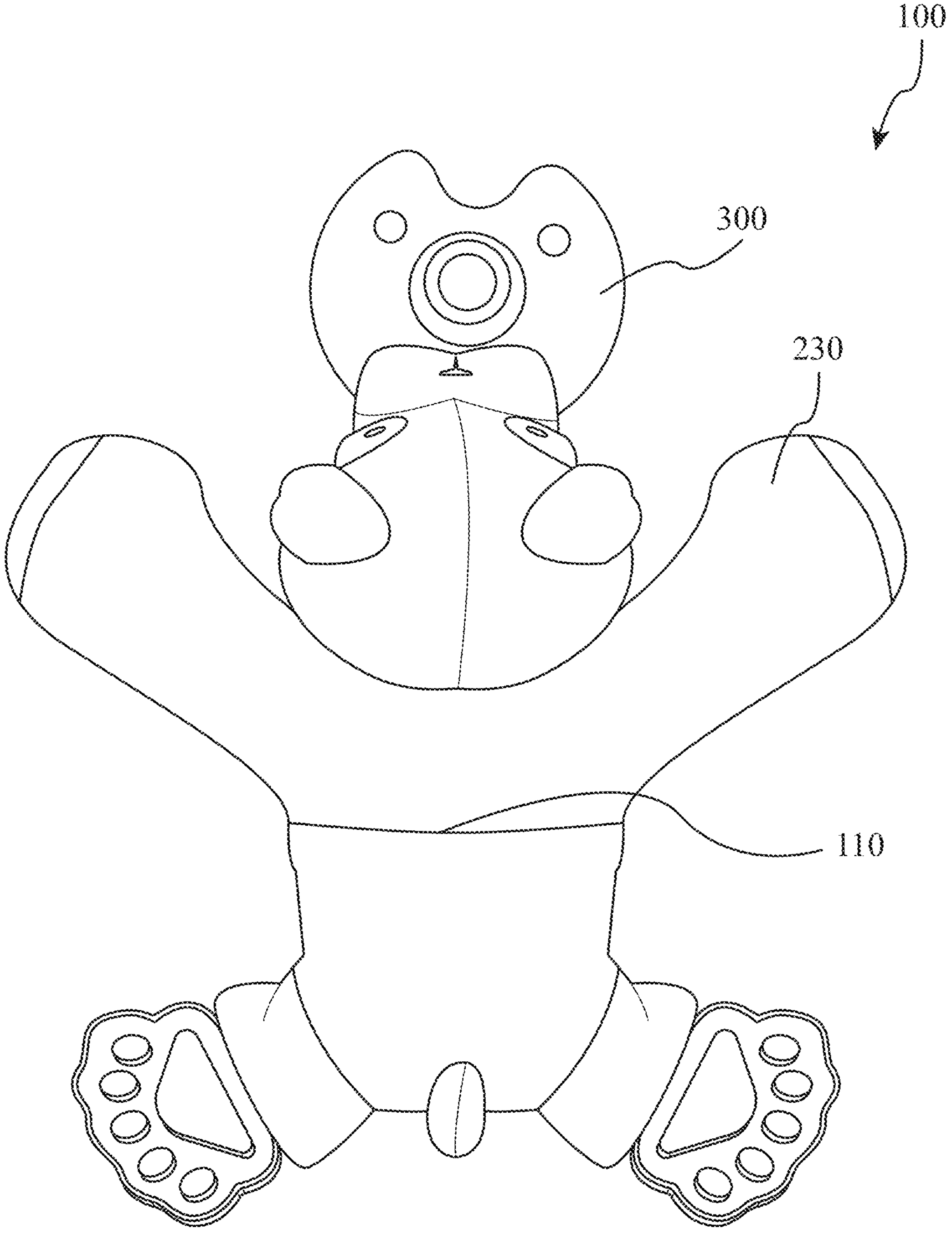
FIG. 1 depicts a top down view of a plush toy comprising an attached pacifier and appendages in the preferred embodiment.
Figure 2:
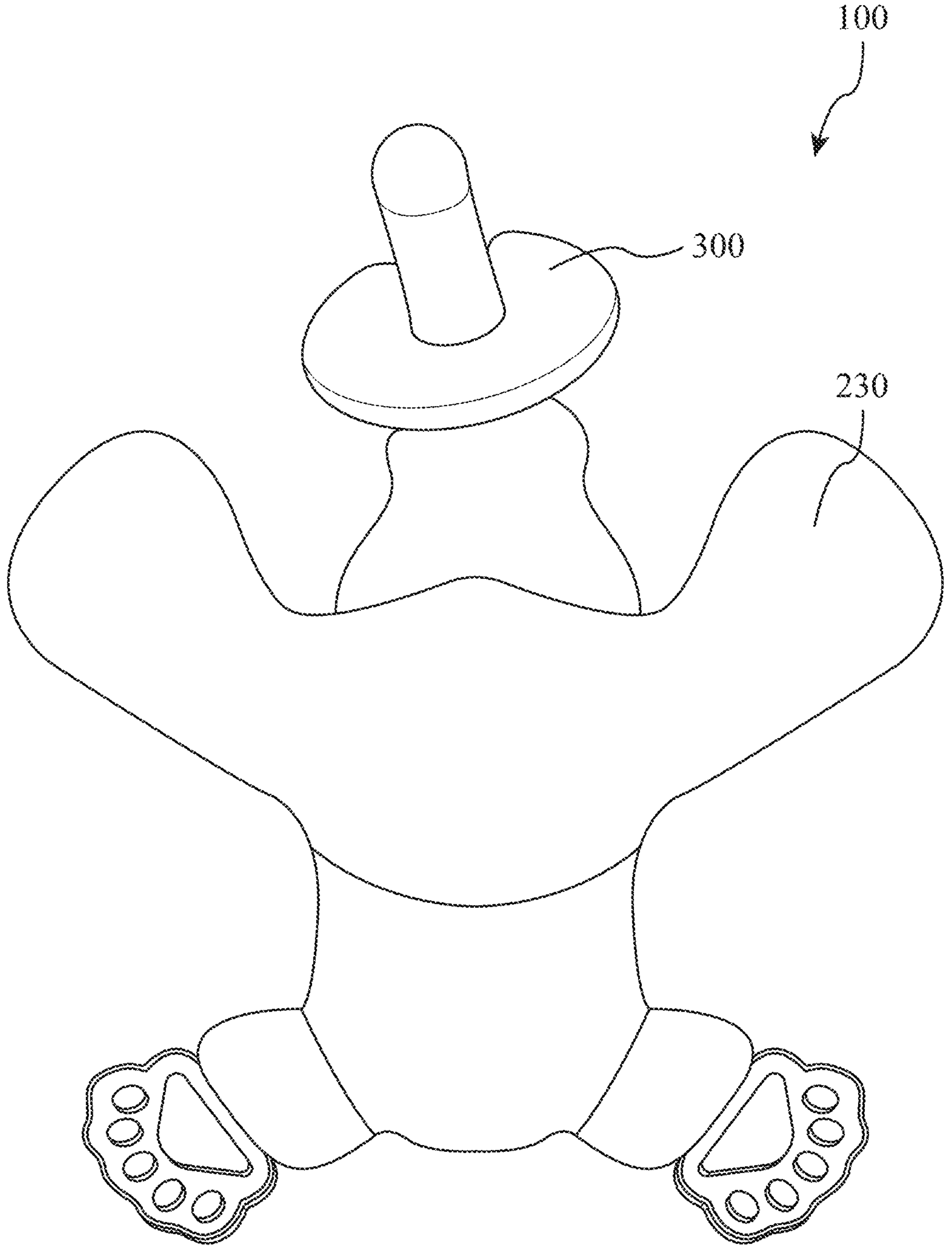
FIG. 2 depicts a bottom up view of a plush toy and textured comprising an attached pacifier in the preferred embodiment.

FIG. **5*a*** depicts a top down view of a plush toy featuring an alternative configuration of textured appendages in an exemplary configuration.

FIG. **5*b*** depicts a top down view of a plush toy featuring another alternative configuration of textured appendages in an exemplary configuration.

FIG. **5*c*** depicts a top down view of a plush toy featuring another additional alternative configuration of textured appendages in an exemplary configuration.

FIG. **5*d*** depicts a top down view of a plush toy featuring yet another additional alternative configuration of textured appendages in an exemplary configuration.

FIG. **6*a*** depicts an exemplary bump texture for utilization as an appendage covering associated with an embodiment of the invention.

FIG. **6*b*** depicts an exemplary ring texture for utilization as an appendage covering associated with an embodiment of the invention.

FIG. **6*c*** depicts an exemplary smooth texture for utilization as an appendage covering associated with an embodiment of the invention.

FIG. **6*d*** depicts an exemplary fuzzy texture for utilization as an appendage covering associated with an embodiment of the invention.

DETAILED DESCRIPTION

The detailed description set forth below provides an description of a preferred embodiment of the contemplated plush toy teething device, which serves the dual purpose of providing comfort and addressing the teething needs of infants. This embodiment of the invention incorporates a plurality of appendages 200 that are each enhanced with a texture intended for teething relief. In various embodiments, at least one of the appendages 200 is dipped in rubber. In various embodiments, at least one of the appendages 200 comprises a fuzzy material. In an embodiment, the invention further comprises a pacifier 300 attached to the main body 110 of the plush toy 100. By merging the soothing presence of a plush toy 100 with the practicality of a pacifier 300 and the relief offered by a teether in association with the preferred embodiment, this example of the invention presents a streamlined approach to infant care, promoting sensory stimulation while maintaining the pacifier's 300 convenience and cleanliness. Detailed insights into the embodiment's configuration are presented herein, offering a thorough understanding of its contribution to the field of infant care products.

The preferred embodiment features a device comprising an innovative plush toy 100 designed to cater to the multifaceted needs of infants and their caregivers. This plush toy 100, which doubles as a comforting companion and a practical teething aid in association with the inventive aspects, further comprises a unique pacifier attachment mechanism and appendages 200 enriched with textured rubber, optionally silicone, and/or a fuzzy surface. In an exemplary embodiment, the invention significantly enhances functionality by integrating a plush toy 100, pacifier 300, and teether aspects comprised of the rubberized or fuzzy appendages 200 into a singular, cohesive product. This multifunctional approach simplifies the caregiving process by reducing the number of items a caregiver must manage, thereby streamlining the infant care experience. Unlike prior art attempts, which primarily focus on the combination of a plush toy 100 with a pacifier 300, the preferred embodiment addresses the need for an all-in-one solution that addresses both the emotional comfort and the physical teething needs of infants. This comprehensive design ensures that the child has continuous access to both soothing and teething relief without the need for additional accessories.

Figure 3:
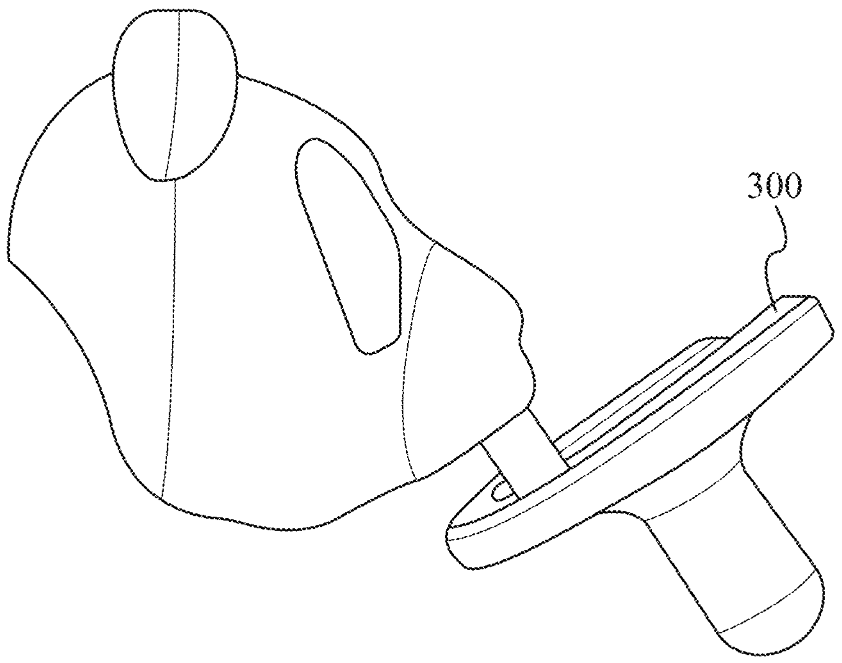
FIG. 3 depicts a side view of the head aspect of a shaped plush toy embodiment comprising a pacifier attachment.
Figure 4:
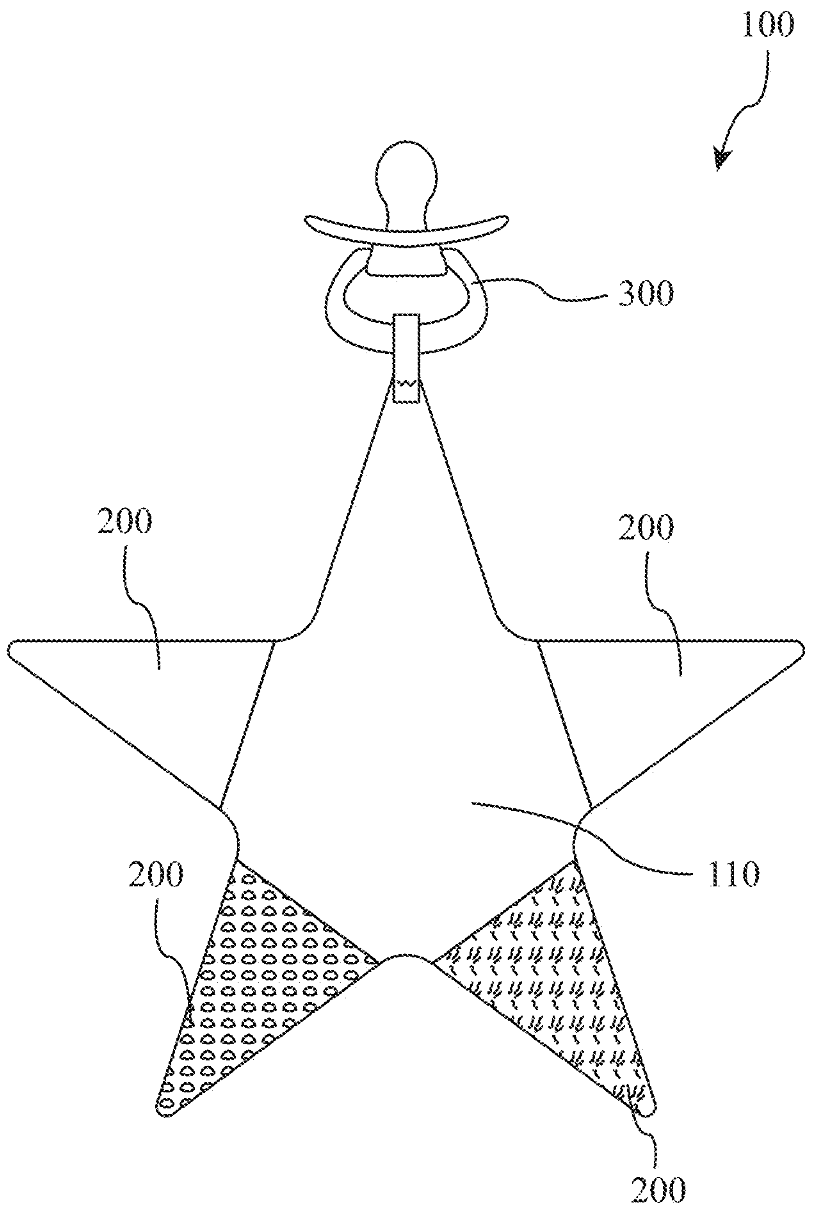
FIG. 4 depicts a top down view of an alternative shape embodiment of a plush toy featuring textured appendages in an exemplary configuration.

A key advantage of the preferred embodiment over the prior art is the inclusion of textured rubber-dipped appendages 200 specifically designed for teething relief. The preferred embodiment of the invention comprises a variety of appendages 200, each designed to serve the dual purpose of providing tactile stimulation and teething relief. Whether the main body 110 of the plush toy 100 is crafted to resemble a friendly animal, such as a cuddly bear as depicted in FIG. 1, a playful puppy, or an endearing bunny, or takes on the form of other objects like a whimsical star as depicted in FIG. 3, or a comforting heart, the teething appendages 200 are a defining feature. For instance, an animal-shaped embodiment might include ears, tails, or paws as appendages 200 at least two of each comprising a different texture, while a star-shaped toy could feature points of varying textures. Each appendage 200 is integrated into the overall design of the plush toy 100, ensuring that the appendages 200 are easily accessible for an infant to interact with, thus enhancing the multi-sensory experience and providing various surfaces for teething comfort. Such appendages 200 offer a safe and effective solution for infants experiencing the discomfort of emerging teeth. The textured surface provides the necessary counterpressure to soothe sore gums, a feature absent in association with prior art devices. By incorporating this teething functionality directly into the plush toy's 100 design in the form of textured appendages 200, the preferred embodiment eliminates the need for separate teething devices, thereby offering a more convenient and comforting experience for the child.

The preferred embodiment's textured appendages 200 are designed to cater to an infant's innate curiosity and developmental milestones. Each appendage 200, whether it be a soft, crinkly element 250, a ribbed, silicone-coated tail, or a bumpy, fabric-covered wing, provides a unique sensory experience. In association with the preferred embodiment, these textures are not random but are chosen based on developmental research that highlights the importance of sensory play in cognitive and motor skill development. The varied surfaces invite infants to grasp, pinch, and stroke, which not only soothes their gums but also enhances their fine motor skills and sensory processing abilities.

In addition to tactile diversity, the appendages 200 in the preferred embodiment may incorporate elements that engage other senses. For example, some appendages 200 could include a gentle squeaker or a rattle encased within a soft fabric, providing auditory feedback that captivates an infant's attention and encourages cause-and-effect learning. Others might integrate contrasting colors and patterns to stimulate visual perception, supporting the development of visual tracking skills. This multi-sensory approach is a significant advancement over the prior art, which primarily focuses on the tactile comfort provided by the plushness of the toy.

Furthermore, the embodiment's design thoughtfully considers the safety and accessibility of these sensory features. The appendages 200 are securely attached to the main body of the toy and are made from materials that are safe for infants to mouth and manipulate. This ensures that the sensory exploration is not only developmentally beneficial but also entirely safe for the infant. The appendages 200 are positioned to be easily reached by infants during tummy time, seated play, or even while being held, making the sensory stimulation consistently available throughout the day.

By offering a multi-textured surface that encourages tactile exploration, the preferred embodiment significantly contributes to the child's sensory development. It provides a rich array of sensory experiences that are crucial for infants' growth and understanding of the world around them. The thoughtful integration of various textures and sensory elements into the plush toy's 100 design makes it an invaluable tool for nurturing an infant's developmental journey, setting the present embodiment apart from the simpler sensory offerings of the prior art.

Figure 5A:
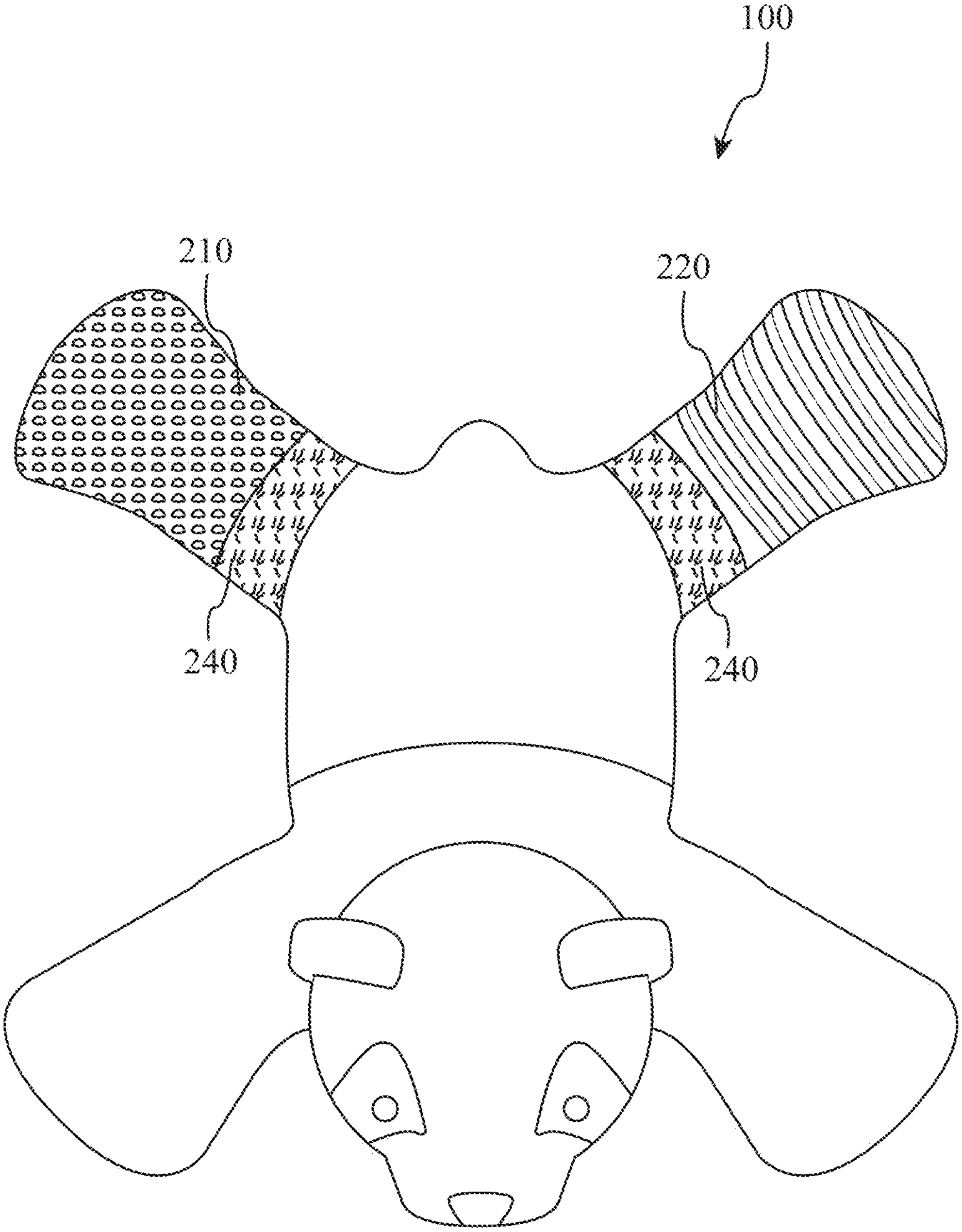

The preferred embodiment's textured rubber-dipped appendages 200 are engineered to cater to the varied teething preferences of infants. In association with the preferred embodiment, it is contemplated that each or some of the appendages 200 will feature a unique texture from at least one other of the appendages 200. In an embodiment, one such texture is the 'bump' texture 210 as depicted in FIG. 5*a*, which closely resembles ribbing and is placed along the silicone appendages 200. The raised bumps 210 in an embodiment are evenly spaced and have a height of approximately 1 to 2 millimeters, offering a rhythmic pattern that infants can rub their gums against for relief. The ribbing not only serves a functional purpose but also adds an aesthetic appeal to the appendages 200, making them visually engaging for the child.

Figure 5B:
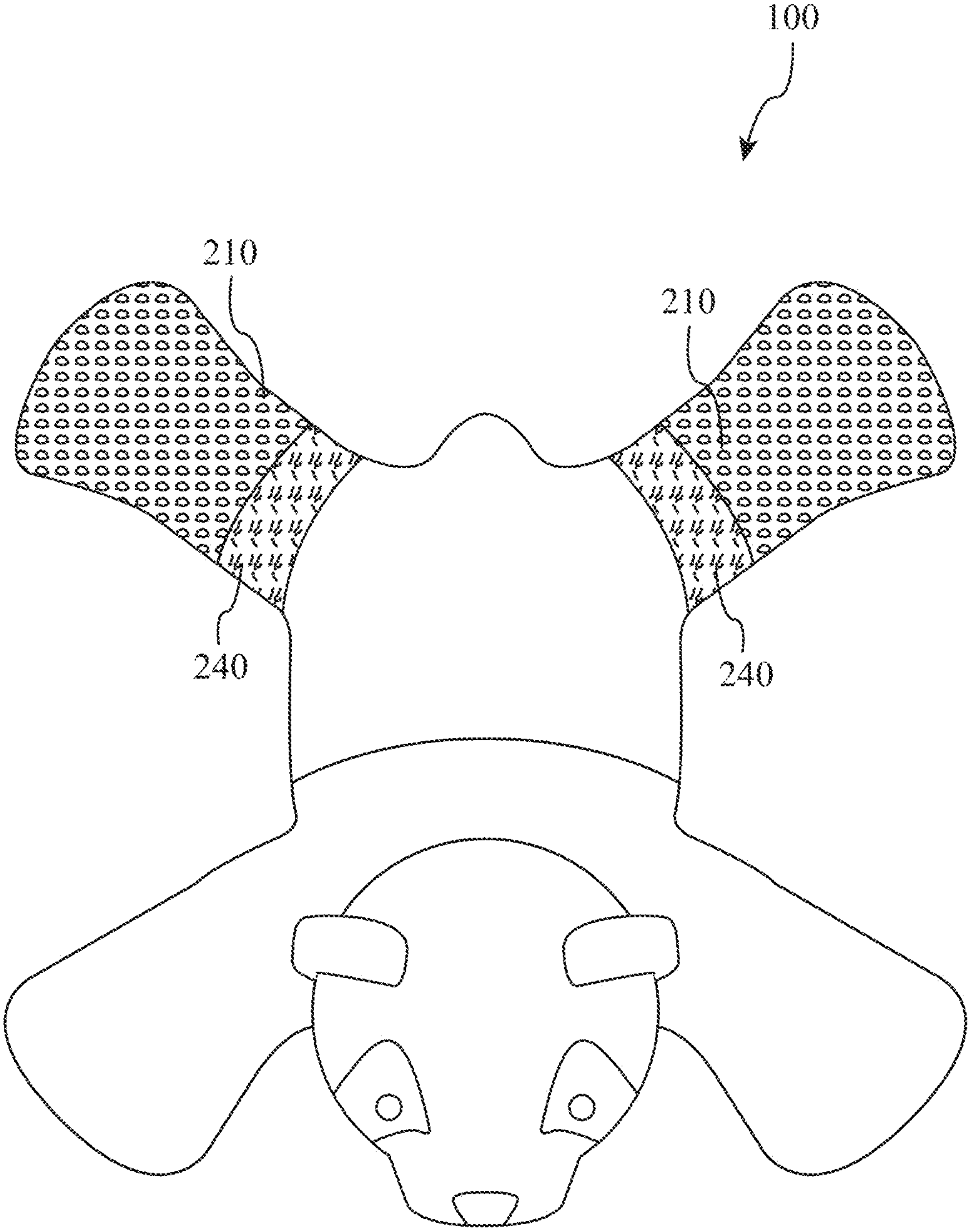

In addition to the ribbed texture, the preferred embodiment also features an additional appendage 200 comprising a 'ring' texture 220 as depicted in FIG. 5*b*, which comprises continuous elevated ridges that run along the circumference of the appendages' 200 exterior surface. These ridges form a series of concentric circles, each ridge being about 1 millimeter in height and spaced approximately 2 millimeters apart. This design allows for an enhanced grip, enabling infants to hold onto the appendages 200 securely while they apply the necessary pressure to alleviate teething discomfort. The continuous nature of the ridges also encourages rotational movement, allowing the child to explore different angles for teething.

Figure 5C:
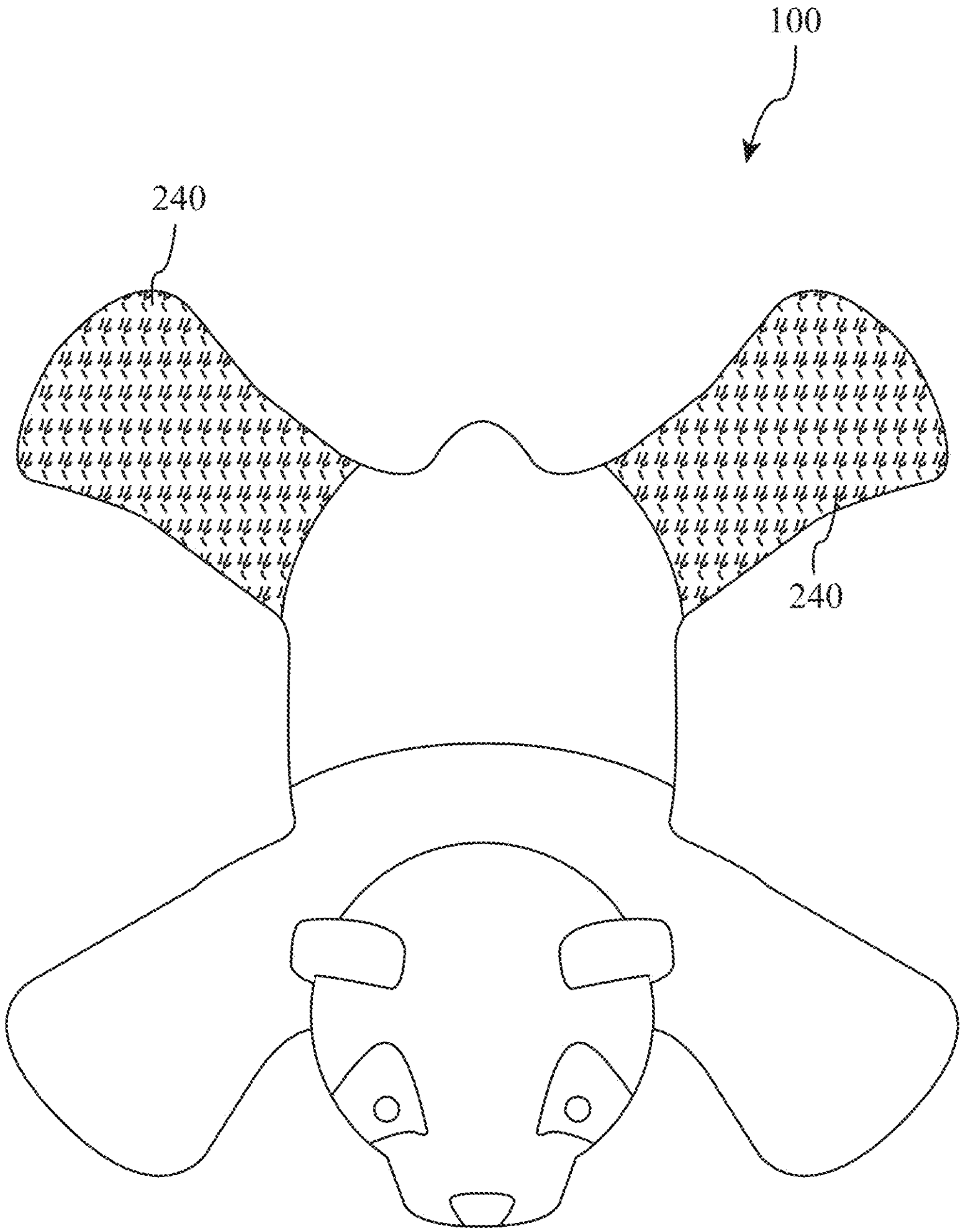

For infants who prefer a less pronounced texture, the preferred embodiment comprises a smooth texture 230 option as depicted in FIG. 5*c*, which comprises a substantially flat silicone surface in an embodiment. This smooth area provides a gentle alternative for infants with sensitive gums or those who are in the early stages of teething. The flat silicone surface is devoid of any raised elements, ensuring a soft and even pressure that can be soothing for tender gums. The smooth texture 230 also serves as a contrast to the more textured areas, providing a diverse sensory experience for the child.

The preferred embodiment's textured rubber-dipped appendages are engineered to cater to the varied teething preferences of infants. In association with the preferred embodiment, it is contemplated that each or some of the appendages will feature a unique texture from at least one other of the appendages. In an embodiment, one such texture is the 'bump' texture as depicted in FIG. 5*a*, which closely resembles ribbing and is placed along the silicone appendages. The raised bumps in an embodiment are evenly spaced and have a height of approximately 1 to 2 millimeters, offering a rhythmic pattern that infants can rub their gums against for relief. The ribbing not only serves a functional purpose but also adds an aesthetic appeal to the appendages, making them visually engaging for the child.

In addition to the ribbed texture, the preferred embodiment also features an additional appendage comprising a 'ring' texture as depicted in FIG. 5*b*, which comprises continuous elevated ridges that run along the circumference of the appendages' exterior surface. These ridges form a series of concentric circles, each ridge being about 1 millimeter in height and spaced approximately 2 millimeters apart. This design allows for an enhanced grip, enabling infants to hold onto the appendages securely while they apply the necessary pressure to alleviate teething discomfort. The continuous nature of the ridges also encourages rotational movement, allowing the child to explore different angles for teething.

For infants who prefer a less pronounced texture, the preferred embodiment comprises a smooth texture option as depicted in FIG. 5*c*, which comprises a substantially flat silicone surface in an embodiment. This smooth area provides a gentle alternative for infants with sensitive gums or those who are in the early stages of teething. The flat silicone surface is devoid of any raised elements, ensuring a soft and even pressure that can be soothing for tender gums. The smooth texture also serves as a contrast to the more textured areas, providing a diverse sensory experience for the child.

Figure 5D:
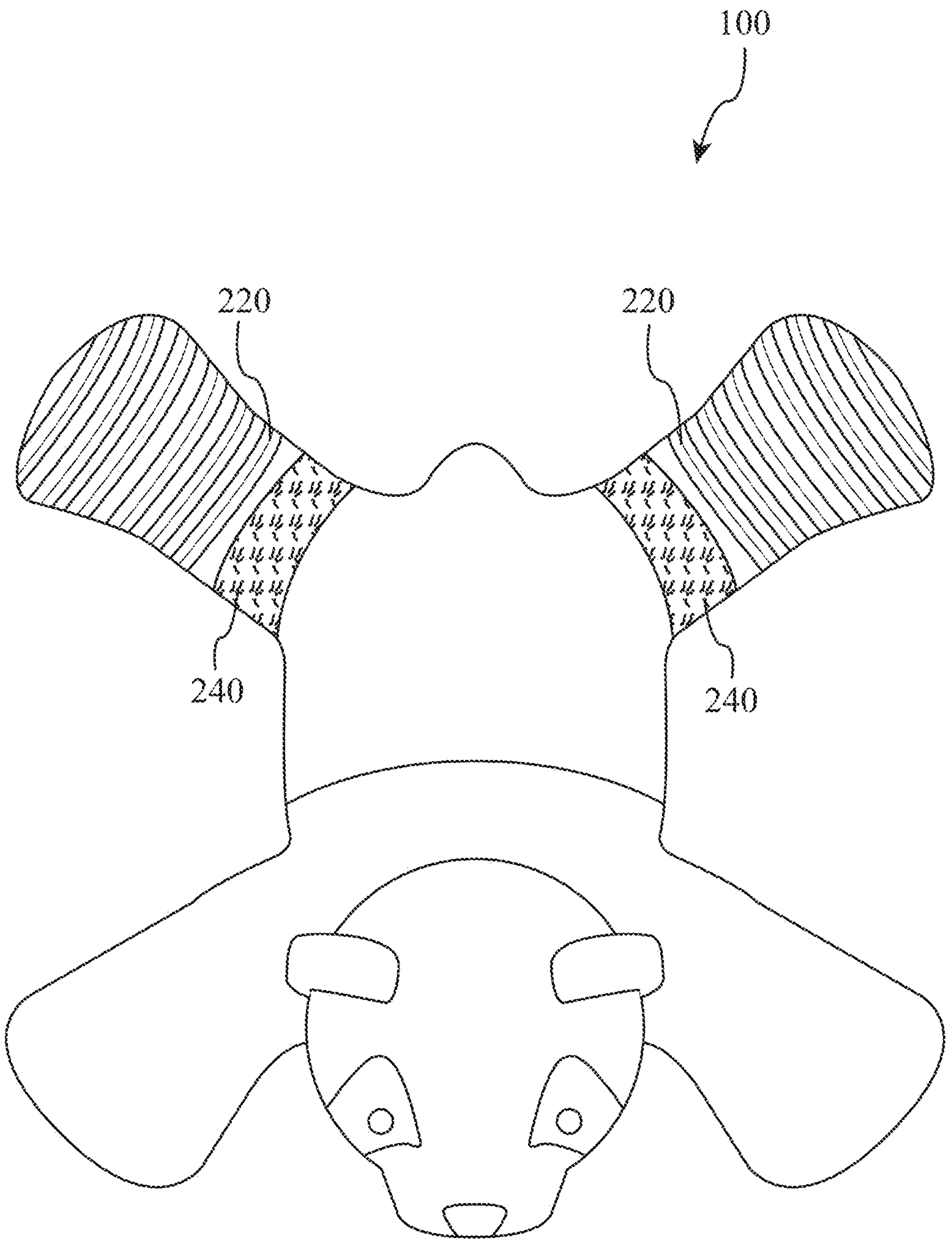
Figure 6A:
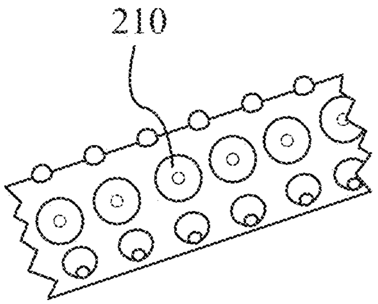
Figure 6B:
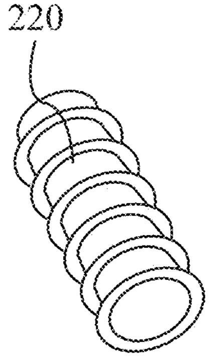
Figure 6C:
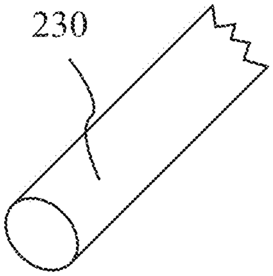
Figure 6D:
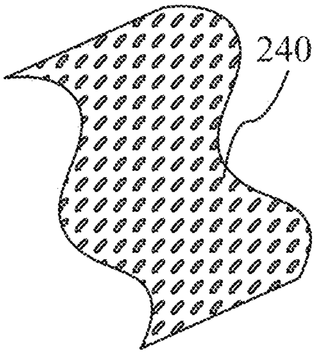

Lastly, the preferred embodiment comprises a fuzzy texture, which in an example comprises either a fabric material or rubber covered in fabric as depicted in FIG. 5*d*. This texture option adds a soft, plush element to the appendages, creating a comforting sensation akin to that of a traditional stuffed toy. The fuzzy texture in the preferred embodiment is achieved by using a short-pile fabric that is securely adhered to the exterior of a rubber surface of the appendage prior to application of the fabric, ensuring that it remains intact even with repeated use. The fabric-covered silicone provides a dual experience of softness from the fabric and the resilience of the underlying rubber, optionally silicone, making it an ideal surface for infants to gnaw and chew on.

By integrating these varied textures into the appendages of the plush toy, the preferred embodiment offers a comprehensive teething solution that caters to the different stages and preferences of teething infants. The thoughtful combination of textures not only enhances the functionality of the plush toy 100 but also enriches the overall sensory experience for the child, an important distinction associated with the invention.

In accordance with embodiments, the bump texture features precisely engineered raised elements that are uniformly distributed across designated appendage surfaces. Each bump protrudes approximately 1.5 millimeters from the base surface, with adjacent bumps spaced at 3-millimeter intervals to create an optimal pattern for gum stimulation. The bumps are formed with gently rounded peaks to prevent any sharp edges while maintaining effective pressure points for teething relief.

In accordance with embodiments, the ring texture comprises a series of concentric circular ridges that encircle the appendage's circumference. Each ridge has a semi-circular profile with a 1-millimeter height and a 2-millimeter base width. The spacing between consecutive rings is maintained at 2 millimeters to create a consistent tactile pattern. This spacing allows for effective cleaning between the ridges while providing distinct tactile feedback as the infant explores the surface.

The varied textures incorporated into the appendages are specifically engineered to provide distinct forms of tactile stimulation that support different aspects of infant sensory development. The bump texture, with its precisely spaced 1.5-millimeter protrusions, is designed to stimulate pressure receptors in the infant's gums and fingers, promoting the development of fine touch discrimination and pressure sensitivity.

The spacing between bumps allows infants to detect individual raised elements, helping develop spatial awareness and tactile pattern recognition.

The ring texture's concentric circular pattern, with its 1-millimeter height ridges spaced 2 millimeters apart, encourages rotational exploration and helps develop directional awareness. This texture pattern promotes the development of oral motor skills as infants learn to manipulate objects with different orientations in their mouth.

The smooth texture provides a contrasting sensory experience that helps infants develop sensitivity to subtle surface variations. The precision-molded surface, with its maximum height variation of 0.1 millimeters, offers a baseline tactile experience that enhances an infant's ability to discriminate between different surface textures.

The fuzzy texture, comprising hypoallergenic short-pile fabric permanently bonded to a silicone base, introduces infants to soft textile sensations while maintaining the safety and durability of the underlying medical-grade silicone. This dual-texture experience helps develop tactile discrimination between hard and soft surfaces while providing comfort similar to traditional plush toys.

The strategic placement of these textures on different appendages creates a comprehensive sensory exploration environment, allowing infants to naturally progress from gentler to more pronounced textures as their sensory processing abilities develop. This thoughtful arrangement supports the natural progression of both tactile sensitivity and motor skill development, as infants learn to reach for, grasp, and manipulate the different textured surfaces.

Each texture incorporated into the appendages is specifically engineered through precise manufacturing processes to deliver targeted tactile feedback that supports key developmental milestones. The bump texture's uniformly distributed raised elements, protruding 1.5 millimeters with 3-millimeter spacing, create a repeating pattern that provides consistent pressure feedback as infants explore with their mouths and hands.

The ring texture's concentric circular ridges, featuring 1-millimeter heights and 2-millimeter base widths, are engineered to create distinct transitional feedback as infants move across the ridges. The 2-millimeter spacing between rings is specifically designed to allow infants to distinguish individual ridges while maintaining a connected sensory experience.

The smooth texture is precision-engineered with a maximum surface variation of 0.1 millimeters, providing subtle tactile feedback that helps develop fine touch sensitivity. This carefully controlled surface is achieved through specialized molding processes that eliminate imperfections, creating a glass-like finish optimized for gentle stimulation.

The fabric-covered surfaces employ a specialized bonding process where medical-grade silicone creates a 2-millimeter thick stable base layer. The hypoallergenic short-pile fabric, with fibers less than 1 millimeter in length, is permanently adhered using medical-grade adhesive to create a dual-feedback surface combining soft textile sensation with firm underlying support.

The textures are strategically arranged to create natural progression patterns, allowing infants to advance from gentler to more pronounced tactile experiences as their sensory processing abilities develop. This engineered arrangement supports both passive discovery and active exploration, with each texture positioned to be easily accessible while encouraging cross-texture exploration.

In accordance with embodiments, for the fabric-covered surfaces, a specialized bonding process is employed wherein medical-grade silicone is first applied to create a stable base layer approximately 2 millimeters thick. A hypoallergenic, short-pile fabric is then permanently adhered to this silicone base using a non-toxic, medical-grade adhesive. The fabric layer is carefully selected to maintain its integrity even with repeated mouthing and washing, with fibers less than 1 millimeter in length to prevent shedding.

In accordance with embodiments, the smooth surfaces associated with the plush toy 100 are engineered with a precision-molded silicone layer that maintains a consistent thickness of 2 millimeters. The surface has a maximum variation in height of no more than 0.1 millimeters across its entire area, ensuring a truly smooth feel. This surface is achieved through a specialized molding process that eliminates any surface imperfections or air bubbles, resulting in a glass-like finish that is both soothing to tender gums and easy to clean.

Each textured appendage is strategically positioned on the plush toy 100 in an embodiment to encourage exploration and provide easy access for the infant user. The varied textures are arranged to create natural progression patterns, allowing infants to move from smoother to more pronounced textures as their teething needs evolve. This thoughtful arrangement of textures supports both sensory development and motor skill progression while providing comprehensive teething relief.

The preferred embodiment in at least one aspect comprises a fuzzy texture 240, which in an example comprises either a fabric material or rubber covered in fabric as depicted in FIG. 5*d*. This texture option adds a soft, plush element to the appendages 200, creating a comforting sensation akin to that of a traditional stuffed toy. The fuzzy texture 240 in the preferred embodiment is achieved by using a short-pile fabric that is securely adhered to the exterior of a rubber surface of the appendage prior to application of the fabric, ensuring that it remains intact even with repeated use. The fabric-covered silicone provides a dual experience of softness from the fabric and the resilience of the underlying rubber, optionally silicone, making it an ideal surface for infants to gnaw and chew on.

By integrating these varied textures into the appendages 200 of the plush toy 100, the preferred embodiment offers a comprehensive teething solution that caters to the different stages and preferences of teething infants.

The process of creating different textured surfaces on the appendages of the plush toy may comprise molding techniques and material applications to create a texture desirable to achieve the desired sensory experience for infants. The following provides an exemplary description of these processes:

In accordance with various embodiments, the appendages of the plush toy, designed for teething and sensory stimulation, are created using various molding techniques that allow for the incorporation of different textures. These techniques may include, but are not limited to:

Injection Molding: This process involves injecting heated rubber material, such as Liquid Silicone Rubber (LSR) or Thermoplastic Elastomers (TPE), into a mold that contains the desired texture patterns. The mold can have raised or recessed areas to create bumps, ridges, or other textures on the surface of the appendages.

Compression Molding: In this method, pre-formed rubber material is placed into a heated mold cavity that is then closed under pressure. The rubber takes the shape of the mold, including any textured designs, resulting in a solid, textured appendage upon cooling.

Overmolding: This technique is used to add a soft rubber layer over a firmer base material. For example, a soft silicone could be overmolded onto a firmer plastic base, creating a dual-texture experience with both soft and firm areas for the infant to explore. In another example, fabric threading threading or another material could be placed upon the appendage in the desired form prior to the application of the soft rubber layer.

Rotational Molding: Suitable for creating hollow appendages, this process involves adding rubber material to a mold and then rotating it bi-axially in an oven. The material coats the inside of the mold, and textures can be formed on the interior surfaces that will be present on the exterior of the final product.

In an embodiment, before the application of the rubber material to an appendage, other materials can be placed over the appendages to provide additional textures:

Fabric Wrapping: A fabric material, such as cotton or plush fleece, can be wrapped around the appendage to create a soft, fuzzy texture. This fabric can be adhered to the appendage using a safe, non-toxic adhesive or by stitching it into place. It is contemplated that such fabric wrapping may be placed over the rubber or alternatively over the other fabric appendage without placement of rubber in association with various embodiments.

Textured Sleeves: Pre-formed sleeves with various textures can be slipped over the appendages. These sleeves could be made from netting for a rough texture, silicone with raised dots for a bump texture, or woven materials for a ribbed texture.

Textured Coatings: A liquid rubber material can be applied over the appendage and manipulated to form textures. For example, brushing or stippling the surface before curing can create a unique texture that differs from the base material.

Embedded Elements: Small, safe, non-toxic elements such as silicone beads or rings can be embedded into the surface of the appendage to provide varied tactile sensations.

Each of these methods allows for the creation of a wide range of textures that can stimulate different sensory responses in infants in association with embodiments of the invention. The textures can be strategically placed upon the appendages of the plush toy to encourage infants to use different parts of their mouths and hands, aiding in their overall sensory and motor development. The materials and processes chosen for creating these textures are selected based on their safety for infants, durability, ease of cleaning, and compliance with industry standards for infant products in association with various embodiments.

In association with various embodiments of the present invention, the appendages 200 of the plush toy 100, which are integral to both the teething functionality and sensory stimulation, comprise a rubber material. The selection of rubber is critical, as it must be safe for infants, provide the necessary durability and flexibility for teething relief, and be conducive to creating a variety of textures for sensory exploration. In association with the preferred embodiment, the rubber used in these embodiments is specifically chosen to meet stringent safety standards, ensuring that it is non-toxic, hypoallergenic, and free from harmful chemicals such as BPA, phthalates, and latex, which could potentially cause allergic reactions or other health concerns.

The present inventor has recognized that the most appropriate choice of the rubber material useful for the appendages 200 in association with the preferred embodiment is designed to be soft enough to provide comfort to the infant's delicate gums but also firm enough to offer the necessary resistance for effective teething relief. Additionally, the rubber in association with the preferred embodiment must be easy to clean and capable of withstanding repeated sterilization processes without degrading, to maintain hygiene and longevity of the product.

A non-exhaustive list of examples of the types of rubber appropriate for the appendages 200 in various embodiments of the invention includes:

Medical-Grade Liquid Silicone Rubber (LSR): Known for its hypoallergenic properties and high purity, LSR is often used in medical devices that come into direct contact with the body. It is heat-cured, resulting in a smooth, non-porous surface that is resistant to bacterial growth, useful in providing the surface of the appendages 200 in the context of the invention. In association with various aspects of embodiments, the silicone utilized is specifically chosen. In an example, the silicone formulation is specifically engineered to be gentle on an infant's sensitive skin and to reduce the risk of allergic reactions. The hypoallergenic properties are achieved through a meticulous selection of silicone materials that are free from potential allergens, such as latex or phthalates, which are known to cause skin irritations in some infants. In association with the preferred embodiment, the silicone formulation selected for the aspects of the invention is a medical-grade Liquid Silicone Rubber (LSR), which is renowned for its hypoallergenic properties and suitability for sensitive applications, including those involving direct contact with infant skin. LSR is a specific type of silicone that is cured under heat, resulting in a smooth, non-porous, and highly pure product. The LSR used in the preferred embodiment is of a grade that meets the stringent requirements of ISO 10993 and USP Class VI certifications, which are standards for biocompatibility, indicating that it has been tested and proven to be safe for use in medical devices that have direct contact with the body. The hypoallergenic nature of the LSR is due to its unique formulation process, which excludes the use of latex, phthalates, and other additives that could potentially cause allergic reactions or skin irritations. The absence of these allergens is critical in association with the preferred embodiment, as latex can contain proteins that trigger latex allergies, and phthalates have been linked to various health concerns. The LSR chosen for this product is also free from BPA (Bisphenol A), ensuring that it does not contain any estrogen-mimicking chemicals that could be harmful to an infant's health. To further support the hypoallergenic properties of the LSR, the manufacturing process in an exemplary embodiment involves a platinum-catalyzed curing system. Unlike peroxide-cured silicones, platinum-cured silicones have a more complete cross-linking, resulting in fewer residual byproducts and a lower risk of leaching. This curing process ensures that the silicone loop is not only hypoallergenic but also exceptionally clean, stable, and odorless, making it ideal for prolonged contact with an infant's skin. The specific LSR used in association with an embodiment is designed to have a Shore A hardness that is soft enough to be gentle on the skin yet firm enough to maintain its structural integrity. A typical Shore A hardness for this application might range from 30 to 50, providing a soft, flexible feel without being overly pliable. The LSR's softness is akin to the softness of human skin, which contributes to its comfort during use. In addition to its hypoallergenic properties, the LSR is also resistant to bacteria growth due to its non-porous nature, which is an essential feature for items that infants frequently place in their mouths.

In association with various aspects of embodiments, the silicone utilized is specifically chosen. In an example, the silicone formulation is specifically engineered to be gentle on an infant's sensitive skin and to reduce the risk of allergic reactions. The hypoallergenic properties are achieved through a meticulous selection of silicone materials that are free from potential allergens, such as latex or phthalates, which are known to cause skin irritations in some infants.

In association with the preferred embodiment, the silicone formulation selected for the aspects of the invention is a medical-grade Liquid Silicone Rubber (LSR), which is renowned for its hypoallergenic properties and suitability for sensitive applications, including those involving direct contact with infant skin. LSR is a specific type of silicone that is cured under heat, resulting in a smooth, non-porous, and highly pure product. The LSR used in the preferred embodiment is of a grade that meets the stringent requirements of ISO 10993 and USP Class VI certifications, which are standards for biocompatibility, indicating that it has been tested and proven to be safe for use in medical devices that have direct contact with the body.

The hypoallergenic nature of the LSR is due to its unique formulation process, which excludes the use of latex, phthalates, and other additives that could potentially cause allergic reactions or skin irritations. The absence of these allergens is critical in association with the preferred embodiment, as latex can contain proteins that trigger latex allergies, and phthalates have been linked to various health concerns. The LSR chosen for this product is also free from BPA (Bisphenol A), ensuring that it does not contain any estrogen-mimicking chemicals that could be harmful to an infant's health.

To further support the hypoallergenic properties of the LSR, the manufacturing process in an exemplary embodiment involves a platinum-catalyzed curing system. Unlike peroxide-cured silicones, platinum-cured silicones have a more complete cross-linking, resulting in fewer residual byproducts and a lower risk of leaching. This curing process ensures that the silicone loop is not only hypoallergenic but also exceptionally clean, stable, and odorless, making it ideal for prolonged contact with an infant's skin.

The specific LSR used in association with an embodiment is designed to have a Shore A hardness that is soft enough to be gentle on the skin yet firm enough to maintain its structural integrity. A typical Shore A hardness for this application might range from 30 to 50, providing a soft, flexible feel without being overly pliable. The LSR's softness is akin to the softness of human skin, which contributes to its comfort during use. In addition to its hypoallergenic properties, the LSR is also resistant to bacteria growth due to its non-porous nature, which is an essential feature for items that infants frequently place in their mouths.

Food-Grade Silicone: Similar to LSR, food-grade silicone is safe for oral contact and is commonly used in cooking utensils and containers. It is durable, heat-resistant, and does not contain any fillers or additives that could leach out, useful in providing the surface of the appendages 200 in the context of the invention.

Thermoplastic Elastomers (TPE): These are a class of copolymers or a physical mix of polymers that exhibit both thermoplastic and elastomeric properties. TPEs can be molded into various textures, particularly useful in providing the surface of the appendages 200 in the context of the invention, and are free from BPA and phthalates.

Natural Rubber (Latex-Free): For infants who are not sensitive to latex, natural rubber can be a suitable choice. However, in the context of this invention, latex-free alternatives would be preferred to avoid potential allergic reactions.

Styrene-Butadiene Rubber (SBR): A synthetic rubber that is often used as an alternative to natural rubber. SBR is durable and abrasion-resistant, making it suitable for teething toys.

Ethylene-Propylene-Diene Monomer (EPDM): This synthetic rubber has excellent weather and ozone resistance, making it suitable for products that require a high degree of durability.

Nitrile Rubber (NBR): Known for its resistance to oils and chemicals, NBR can be used in applications where the rubber will be subjected to rigorous cleaning agents.

Butyl Rubber (IIR): With its low permeability to gases and excellent vibration damping, butyl rubber can be used for textured appendages 200 that may include a squeaker or other noise-making element.

Polyisoprene: This synthetic rubber mimics the properties of natural rubber without the allergens, making it an ideal hypoallergenic material for infant products.

Fluorosilicone Rubber (FSR): Offers similar properties to silicone rubber but with enhanced chemical resistance, suitable for teething toys that may come into contact with various cleaning agents.

It is specifically contemplated by the inventor that alternative rubbers and similar materials may be suitable and even preferable in association with embodiments of the invention. Each of these rubber types can be formulated and processed to achieve the desired textures and properties for the appendages 200 of the plush toy 100 in association with various embodiments. The choice of rubber would be based on a balance of safety, functionality, and manufacturability to ensure that the final product meets the needs of infants and caregivers while adhering to safety regulations and standards.

In embodiments of the invention, the plurality of appendages 200 each feature at least one of a variety of textures, examples of which are described elsewhere herein. The process of creating different textured surfaces on the appendages 200 of the plush toy 100 may comprise molding techniques and material applications to create a texture desirable to achieve the desired sensory experience for infants. The following provides an exemplary description of these processes:

Molding Techniques for Textured Surfaces

The appendages 200 of the plush toy 100, designed for teething and sensory stimulation, can be created using various molding techniques that allow for the incorporation of different textures. These techniques may include, but are not limited to:

Injection Molding: This process involves injecting heated rubber material, such as Liquid Silicone Rubber (LSR) or Thermoplastic Elastomers (TPE), into a mold that contains the desired texture patterns. The mold can have raised or recessed areas to create bumps, ridges, or other textures on the surface of the appendages 200.

Compression Molding: In this method, pre-formed rubber material is placed into a heated mold cavity that is then closed under pressure. The rubber takes the shape of the mold, including any textured designs, resulting in a solid, textured appendage 200 upon cooling.

Overmolding: This technique is used to add a soft rubber layer over a firmer base material. For example, a soft silicone could be overmolded onto a firmer plastic base, creating a dual-texture experience with both soft and firm areas for the infant to explore. In another example, fabric threading threading or another material could be placed upon the appendage 200 in the desired form prior to the application of the soft rubber layer.

Rotational Molding: Suitable for creating hollow appendages 200, this process involves adding rubber material to a mold and then rotating it bi-axially in an oven. The material coats the inside of the mold, and textures can be formed on the interior surfaces that will be present on the exterior of the final product.

Application of Materials for Additional Textures:

In an embodiment, before the application of the rubber material to an appendage 200, other materials can be placed over the appendages 200 to provide additional textures:

Fabric Wrapping: A fabric material, such as cotton or plush fleece, can be wrapped around the appendage 200 to create a soft, fuzzy texture 240. This fabric can be adhered to the appendage 200 using a safe, non-toxic adhesive or by stitching it into place. It is contemplated that such fabric wrapping may be placed over the rubber or alternatively over the other fabric appendage 200 without placement of rubber in association with various embodiments.

Textured Sleeves: Pre-formed sleeves with various textures can be slipped over the appendages 200. These sleeves could be made from netting for a rough texture, silicone with raised dots for a bump texture 210, or woven materials for a ribbed texture.

Textured Coatings: A liquid rubber material can be applied over the appendage 200 and manipulated to form textures. For example, brushing or stippling the surface before curing can create a unique texture that differs from the base material.

Embedded Elements: Small, safe, non-toxic elements such as silicone beads or rings can be embedded into the surface of the appendage 200 to provide varied tactile sensations.

Each of these methods allows for the creation of a wide range of textures that can stimulate different sensory responses in infants in association with embodiments of the invention. The textures can be strategically placed upon the appendages 200 of the plush toy 100 to encourage infants to use different parts of their mouths and hands, aiding in their overall sensory and motor development. The materials and processes chosen for creating these textures are selected based on their safety for infants, durability, ease of cleaning, and compliance with industry standards for infant products in association with various embodiments.

An embodiment comprises a secure yet detachable method for attaching the pacifier 300 to the plush toy 100.

This feature allows caregivers to easily remove the pacifier 300 for cleaning or replacement, addressing hygiene concerns that are particularly critical in infant care products. Unlike U.S. Pat. No. 11,638,679 which is hereby incorporated by reference in its entirety and which comprises a releasable coupling mechanism, the present invention seamlessly further comprises additional teething functionality. The detachable nature of the pacifier 300 attachment in association with the preferred embodiment ensures that the plush toy 100 remains a versatile and hygienic option for caregivers and infants alike.

In association with the preferred embodiment, the textured appendages 200 are not only functional as teethers but also serve as tools for sensory exploration and stimulation. This design consideration is rooted in the understanding of an infant's developmental need for varied sensory experiences. The prior art, while offering the comfort of a plush toy 100, does not provide additional features for sensory stimulation. The present embodiment fills this gap by offering a multi-textured surface that encourages tactile exploration, which is essential for the child's sensory development.

The preferred embodiment offers a practical solution to the common problem of lost pacifiers and teethers by securely attaching them to the plush toy 100. This feature ensures that these essential items remain within easy reach of the child and are less likely to be misplaced or dropped, a concern not fully addressed by the prior art. By permanently or detachably attaching the pacifier 300 and teether appendages 200 to the plush toy 100, and optionally additionally tethering the device to an external fixed object in accordance with an embodiment, the contemplated device provides peace of mind to caregivers and reduces the potential for distress caused by lost accessories.

The versatility of the preferred embodiment is evident in its design, which allows the plush toy 100 to be used independently of the pacifier 300. Indeed, embodiments of the invention are contemplated without the inclusion of a pacifier 300. This adaptability is advantageous as it extends the utility of the plush toy 100 beyond its role as a pacifier holder, allowing it to serve as a standalone comfort object for the child. The prior art's design, which ties the primary function of the plush toy 100 to the pacifier 300, may limit its use in situations where the pacifier 300 is not required. In a variety of embodiments, the versatile design ensures that the plush toy 100 remains a valuable and comforting presence in the child's life, even as their needs evolve.

Supporting the developmental needs of infants is a critical consideration associated with embodiments of the invention. By providing both a teething solution and sensory stimulation, the embodiment aids in the child's developmental journey. The inclusion of various textures and the teething functionality cater to the child's need for sensory exploration and physical relief during the teething phase. This holistic approach to developmental support sets the present embodiment apart from prior art devices, which primarily focus on comfort without addressing the broader developmental needs of the child.

In an exemplary embodiment of the present invention, the plush toy is designed with dimensions that cater to both the comfort and safety of infants. The main body of the plush toy, which includes the torso and head in association with an exemplary embodiment, measures approximately 15 centimeters in height and 10 centimeters in width, providing a sizeable yet manageable toy for infants to hold and cuddle. The thickness of the main body is thoughtfully set at around 5 centimeters, ensuring that the plush toy retains its softness and huggability while being substantial enough to prevent it from slipping through crib slats or other similar gaps.

The appendages of the plush toy, which double as teething aids, are carefully crafted to be both functional and safe for infants to interact with. Each appendage in accordance with the preferred embodiment extends approximately 6 centimeters from the main body, offering ample space for an infant to grasp and chew. The textured tips of the appendages have a diameter of about 2 centimeters, providing an ideal surface area for teething relief without posing a choking hazard. The rubber material applied in embodiments is approximately 2 millimeters thick, balancing the need for durability with the flexibility required for a gentle teething experience.

The pacifier attachment feature in embodiments comprises a standard-sized pacifier. The pacifier itself, in association with the preferred embodiment, is permanently attached and protrudes outward by approximately 4 centimeters, making it easily accessible for the infant while ensuring that the plush toy remains comfortably engaged.

For instances where caregivers may wish to attach the plush toy to a fixed object, such as a crib rail, stroller, or car seat, in various embodiments an additional tether is incorporated into the design. This tether could be a flexible, ribbon-like strap with a hook-and-loop fastener at the end. The length of the strap is adjustable, allowing it to wrap around various objects and secure back onto itself with the hook-and-loop system. This versatility ensures that the plush toy can be kept within the infant's reach, preventing it from being dropped or lost during outings or in the crib.

Alternatively, the tether may comprise a clip mechanism, similar to those found on pacifier clips commonly used by parents. The clip is attached to the plush toy through a short, sturdy ribbon and can be opened and closed with a simple pinch action, allowing it to be clipped onto clothing, fabric, or thin solid materials. The clip is designed to be strong enough to withstand the tugging of an infant but can be easily operated by an adult to relocate the plush toy as needed. In an embodiment, the clip comprises a robust polymer known for its exceptional mechanical properties. This polymer is selected based on criteria that prioritize both strength and safety, ensuring that it can endure the vigorous and often unpredictable usage patterns typical of infants.

In embodiments of the invention, the dimensions of the attachment mechanisms are carefully considered to ensure functionality, safety, and ease of use. In an exemplary embodiment, a silicone loop is used to detachably attach the pacifier to the plush toy, or provide a tether, which comprises an unstretched inner diameter of approximately 15 millimeters, allowing it to fit snugly around standard pacifier handles or alternatively to external bodies. The loop's thickness might be around 3 millimeters, providing enough strength to hold the pacifier securely while still being flexible. The loop's overall length in an example is about 50 millimeters, giving enough stretch to accommodate various pacifier sizes without becoming a choking hazard.

These dimensions are exemplary and can be adjusted according to manufacturing requirements, safety standards, or to accommodate different plush toy sizes and pacifier types. All materials used in the attachment mechanisms would be selected for their durability, non-toxicity, and compliance with safety standards for infant products.

In an exemplary embodiment of the present invention, the plush toy 100 is designed with dimensions that cater to both the comfort and safety of infants. The main body of the plush toy 100, which includes the torso and head in association with an exemplary embodiment, measures approximately 15 centimeters in height and 10 centimeters in width, providing a sizeable yet manageable toy for infants to hold and cuddle. The thickness of the main body is thoughtfully set at around 5 centimeters, ensuring that the plush toy 100 retains its softness and huggability while being substantial enough to prevent it from slipping through crib slats or other similar gaps.

The appendages 200 of the plush toy 100, which double as teething aids, are carefully crafted to be both functional and safe for infants to interact with. Each appendage 200 in accordance with the preferred embodiment extends approximately 6 centimeters from the main body, offering ample space for an infant to grasp and chew. The textured tips of the appendages 200 have a diameter of about 2 centimeters, providing an ideal surface area for teething relief without posing a choking hazard. The rubber material applied in embodiments is approximately 2 millimeters thick, balancing the need for durability with the flexibility required for a gentle teething experience.

The pacifier attachment feature in embodiments comprises a standard-sized pacifier 300. The pacifier 300 itself, in association with the preferred embodiment, is permanently attached and protrudes outward by approximately 4 centimeters, making it easily accessible for the infant while ensuring that the plush toy 100 remains comfortably engaged.

For instances where caregivers may wish to attach the plush toy 100 to a fixed object, such as a crib rail, stroller, or car seat, in various embodiments an additional tether is incorporated into the design. This tether could be a flexible, ribbon-like strap with a hook-and-loop fastener at the end. The length of the strap is adjustable, allowing it to wrap around various objects and secure back onto itself with the hook-and-loop system. This versatility ensures that the plush toy 100 can be kept within the infant's reach, preventing it from being dropped or lost during outings or in the crib. Alternatively, the tether may comprise a clip mechanism, similar to those found on pacifier clips commonly used by parents. The clip is attached to the plush toy 100 through a short, sturdy ribbon and can be opened and closed with a simple pinch action, allowing it to be clipped onto clothing, fabric, or thin solid materials. The clip is designed to be strong enough to withstand the tugging of an infant but can be easily operated by an adult to relocate the plush toy 100 as needed. In an embodiment, the clip comprises a robust polymer known for its exceptional mechanical properties. This polymer is selected based on criteria that prioritize both strength and safety, ensuring that it can endure the vigorous and often unpredictable usage patterns typical of infants.

In embodiments of the invention, the dimensions of the attachment mechanisms are carefully considered to ensure functionality, safety, and ease of use. In an exemplary embodiment, a silicone loop is used to detachably attach the pacifier 300 to the plush toy 100, or provide a tether, which comprises an unstretched inner diameter of approximately 15 millimeters, allowing it to fit snugly around standard pacifier handles or alternatively to external bodies. The loop's thickness might be around 3 millimeters, providing enough strength to hold the pacifier 300 securely while still being flexible. The loop's overall length in an example is about 50 millimeters, giving enough stretch to accommodate various pacifier sizes without becoming a choking hazard.

These dimensions are exemplary and can be adjusted according to manufacturing requirements, safety standards, or to accommodate different plush toy 100 sizes and pacifier 300 types. All materials used in the attachment mechanisms would be selected for their durability, non-toxicity, and compliance with safety standards for infant products.

In accordance with various embodiments of the invention, the dimensions are considered to ensure that the plush toy 100 serves its multifunctional purpose effectively. The dimensions provide a balance between functionality, safety, and ease of use, making the plush toy 100 with pacifier 300 attachment and teething features a thoughtfully designed product for infants and caregivers alike.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

I claim:

1. An infant sensory development product comprising:

a plush toy body fabricated from hypoallergenic polyester material;

a plurality of appendages connected to the plush toy body;

wherein at least two of the appendages comprise different textures in a progression pattern from smoother to more pronounced textures, wherein the progression pattern comprises a sequential arrangement of the textures calibrated to stimulate specific neural pathways associated with infant sensory processing development, the textures comprising;

two appendages comprising a smooth surface, and two appendages comprising a fuzzy texture surface comprising a hypoallergenic short-pile fabric adhered to a silicone base layer;

wherein the appendages are positioned to create a developmental progression allowing infants to move from the smoother to more pronounced textures as their tactile sensitivity develops, thereby providing targeted sensory stimulation at different developmental stages.

2. The infant sensory development product of claim 1, wherein the plush toy body comprises raised elements providing additional tactile stimulation distinct from the textures of the appendages.

3. The infant sensory development product of claim 1, wherein the appendages are positioned at geometrically opposed intervals around the plush toy body to facilitate balanced motor skill development during tactile exploration.

4. The infant sensory development product of claim 1, wherein the textures vary in firmness, with the smoother textures having a Shore A hardness of 20-30 and the more pronounced textures having a Shore A hardness of 40-50, providing progressive resistance for developing mouth muscles during the teething phase.

5. The infant sensory development product of claim 1, further comprising a washable fabric core structure that maintains the strategic positioning of the appendages even after repeated machine washing cycles.

6. The infant sensory development product of claim 1, the two appendages comprising a smooth surface further comprising raised elements protruding 1-2 millimeters from the smooth surface.

* * * * *